(12) United States Patent
Okamoto et al.

(10) Patent No.: US 9,010,394 B2
(45) Date of Patent: Apr. 21, 2015

(54) GLASS PANEL WITH GLAZING GASKET MANUFACTURING METHOD AND MANUFACTURING APPARATUS

(75) Inventors: Yohei Okamoto, Hiratsuka (JP); Yugo Nagase, Hiratsuka (JP)

(73) Assignee: The Yokohama Rubber Co., Ltd. (JP)

( * ) Notice: Subject to any disclaimer, the term of this patent is extended or adjusted under 35 U.S.C. 154(b) by 0 days.

(21) Appl. No.: 14/127,058

(22) PCT Filed: Jun. 15, 2012

(86) PCT No.: PCT/JP2012/003923
§ 371 (c)(1),
(2), (4) Date: Dec. 17, 2013

(87) PCT Pub. No.: WO2012/172814
PCT Pub. Date: Dec. 20, 2012

(65) Prior Publication Data
US 2014/0144569 A1    May 29, 2014

(30) Foreign Application Priority Data
Jun. 17, 2011    (JP) .................................. 2011-134759

(51) Int. Cl.
*B32B 41/00* (2006.01)
*B29C 47/02* (2006.01)
(Continued)

(52) U.S. Cl.
CPC ................. *B29C 47/92* (2013.01); *G01B 11/14* (2013.01); *E06B 2003/6235* (2013.01); *E06B 3/67356* (2013.01); *B29C 47/0002* (2013.01); *B29C 47/025* (2013.01); *B29C 47/0009* (2013.01); *B29C 47/02* (2013.01); *C03C 17/32* (2013.01); *C03C 27/06* (2013.01); *B29C 47/04* (2013.01); *B29C 47/38* (2013.01); *B29C 47/0066* (2013.01); *B29C 47/0069* (2013.01);
(Continued)

(58) Field of Classification Search
USPC ........ 156/64, 99, 107, 109, 242, 243, 244.11, 156/244.22, 356, 366, 367, 368, 378
See application file for complete search history.

(56) References Cited

U.S. PATENT DOCUMENTS 6,494,245 B1 * 12/2002 Simone ......................... 156/578
2012/0138212 A1 * 6/2012 Toriumi et al. ............... 156/109

FOREIGN PATENT DOCUMENTS

JP    2001-324307    11/2001
JP    2011-051802    3/2011

OTHER PUBLICATIONS

International Search Report dated Jul. 10, 2012, 2 pages, Japan.

*Primary Examiner* — George Koch
(74) *Attorney, Agent, or Firm* — Thorpe, North & Western LLP

(57) ABSTRACT

The technology provides for alignment of forming positions of glazing gaskets formed on both front and rear sides of a glass panel. After the glazing gasket has been formed on the multilayer glass panel, a first distance L1 is measured from the reference member to the glazing gasket. After the multilayer glass panel has been reversed and positioned at the reference position for the glass panel, a second distance L1' is measured from the reference member to the glazing gasket. An offset amount of the forming position of the glazing gasket on the rear side of the multilayer glass panel is determined from the difference of the first distance L1 and the second distance L1'. An application starting position of the application nozzle when forming the glazing gasket on the rear side of the multilayer glass panel is corrected based on the offset amount.

8 Claims, 11 Drawing Sheets

(51) Int. Cl.
*B29C 47/92* (2006.01)
*E06B 3/673* (2006.01)
*B29C 47/00* (2006.01)
*C03C 17/32* (2006.01)
*C03C 27/06* (2006.01)
*B29C 47/04* (2006.01)
*B29C 47/38* (2006.01)
*G01B 11/14* (2006.01)
*E06B 3/62* (2006.01)

(52) U.S. Cl.
CPC .......... *B29C2947/92076* (2013.01); *B29C 2947/92571* (2013.01)

GLASS PANEL WITH GLAZING GASKET MANUFACTURING METHOD AND MANUFACTURING APPARATUS

This application is a national stage entry of PCT/JP2012/003923 filed Jun. 15, 2012.

TECHNICAL FIELD

The present technology relates to a glass panel with a glazing gasket manufacturing method and manufacturing apparatus that applies glazing gasket molding material to both front and rear sides of a glass panel to form glazing gaskets.

BACKGROUND

The applicant has already proposed a method of manufacturing a multilayer glass panel with a glazing gasket by ejecting glazing gasket molding material such as a thermoplastic elastomer in a constant shape together with an adhesive from an application nozzle, applying them onto the surface of the glass panel to form the glazing gasket, to install the glazing gasket on the surface of the glass panel with an adhesive (see Japanese Unexamined Patent Application Publication No. 2011-51802).

In this previous application, the glazing gasket molding material and the adhesive are ejected from the application nozzle superimposed in two layers and applied onto the surface of the glass panel.

However, when manufacturing the multilayer glass panel with a glazing gasket as described above, as illustrated in FIG. 1, first, plasticized resin material is extruded from an application nozzle (not illustrated) at a position on a front side peripheral edge of a multilayer glass panel 2 via an adhesive layer so that it is applied along the whole length of the front side peripheral edge of the multilayer glass panel 2, to form a front side glazing gasket 4. Next, the multilayer glass panel 2 is reversed, and plasticized resin material is extruded from the application nozzle (not illustrated) onto a position on a rear side peripheral edge of the multilayer glass panel 2 via the adhesive layer so that it is applied along the whole length of the rear side peripheral edge of the multilayer glass panel 2, to form a rear side glazing gasket 6. In this way, it is possible to manufacture the multilayer glass panel with a glazing gasket.

With such a multilayer glass panel, it is possible to manufacture the multilayer glass panel with a glazing gasket by directly applying the plasticized resin material to the surface of the glass panel, so automation is easy, and it is possible to form the glazing gasket on the surface of the glass panel at high speed, so it is possible to increase the productivity of the multilayer glass panel with a glazing gasket.

However, when applying the resin material on the front side and the rear side of the multiplayer glass panel to form glazing gaskets, each application operation is carried out as a separate process, and moreover, when forming the glazing gasket on the rear side of the multilayer glass panel, the multilayer glass panel is reversed after forming the glazing gasket on the front side, set on a work table with the rear side facing upward, and positioned. In this case, a positional deviation d as illustrated in FIG. 1 will occur between the front side glazing gasket 4 and the rear side glazing gasket 6, due to variation in the accuracy of cutting the glass and the accuracy in bonding the glass together, as well as due to variation in accuracy of positioning the glazing gasket with respect to the multilayer glass panel and variation in operational accuracy of the application device in the process of manufacturing the multilayer glass panel.

Therefore, if, for example, the rear side glazing gasket 6 has deviated to farther inner side than the front side glazing gasket 4, producing a value of deviation d between the two, and this value exceeds the allowable range of the inside dimension of a sash 8, for example, 2 mm, then even though the multilayer glass panel with a glazing gasket 2 is fitted to the sash 8 as illustrated in FIG. 1, the inside dimension of the sash 8 is constant, so a gap occurs between a fitting edge 8a of the sash 8 and a fitting step 4a of the front side glazing gasket 4 or a fitting step 6a of the rear side glazing gasket 6 fitted to the fitting edge 8a. As a result, the water tightness and air tightness of the multilayer glass panel fitted to the sash is damaged.

Also, depending on the size of the deviation between the front side and rear side glazing gaskets, it may not be possible to fit the front side or the rear side glazing gasket to the sash, and, in addition, it may not be possible for the multilayer glass panel to be held in the sash.

SUMMARY

The present technology provides a glass panel with a glazing gasket manufacturing method and manufacturing apparatus capable of automatically aligning the forming positions at which the glazing gaskets are formed individually on the periphery of the front side and the rear side of the glass panel, without being affected by the variation in the glass cutting accuracy or the glass joining accuracy in the glass panel manufacturing process.

The present technology provides a glass panel with a glazing gasket manufacturing method in which a glazing gasket is formed along a preset glazing gasket forming position on a periphery of a first face of a rectangular glass panel by ejecting glazing gasket molding material in a constant shape together with an adhesive from an application nozzle while at least one of the application nozzle and a work table on which the glass panel is placed is moved, then, the glass panel is reversed and a glazing gasket is formed along a preset glazing gasket forming position in the same way on a periphery of a second face of the glass panel, thereby forming a glazing gasket on both sides of the glass panel, the method comprises: calculating a difference between the glazing gasket forming position on the first face viewed from above after two orthogonal sides of the glass panel have been positioned at a reference position for the glass panel on the work table with the first face facing upward and the glazing gasket has been formed on the first face of the glass panel, and the glazing gasket forming position on the second face viewed from above after the glass panel has been reversed and placed on the work table with the second face facing upward and the side opposite a first side of the two orthogonal sides and the side opposite a second side of the two orthogonal sides have been repositioned at the reference position for the glass panel; calculating an offset amount for the preset glazing gasket forming position on the second face of the glass panel based on the difference; and correcting an application starting position of the application nozzle based on the offset amount when forming the glazing gasket on the second face of the glass panel.

Also, the present technology provides a glass panel with a glazing gasket manufacturing apparatus in which a glazing gasket is formed along a preset glazing gasket forming position on a periphery of a first face of a rectangular glass panel by ejecting glazing gasket molding material in a constant shape together with an adhesive from an application nozzle while at least one of the application nozzle and a work table on which the glass panel is placed is moved, then, the glass panel is reversed and a glazing gasket is formed along a preset glazing gasket forming position in the same way on a periphery of a second face of the glass panel, thereby forming a glazing gasket on both sides of the glass panel, the apparatus comprises: a positioning member provided on the work table that positions two orthogonal sides of the glass panel at a reference position for the glass panel; an offset amount calculation means or module for calculating a difference between the glazing gasket forming position on the first face viewed from above after the glass panel has been positioned at the reference position for the glass panel on the work table using the positioning member with the first face facing upward and the glazing gasket has been formed on the first face of the glass panel, and the forming position on the second face viewed from above after the glass panel has been reversed and placed on the work table with the second face facing upward and the side opposite a first side of the two orthogonal sides and the side opposite a second side of the two orthogonal sides have been repositioned at the reference position for the glass panel using the positioning member, and determining the offset amount for the preset glazing gasket forming position on the second face of the glass panel based on the difference; and an application nozzle control means or module for correcting the application starting position of the application nozzle that forms the glazing gasket on the second face of the glass panel based on the offset amount.

According to the present technology, a difference is calculated between the glazing gasket forming position on the first face viewed from above after the two orthogonal sides of the glass panel have been positioned at the reference position for the glass panel on the work table with the first face of the multilayer glass panel facing upward, and the glazing gasket has been formed on the first face of the multilayer glass panel, and the glazing gasket forming position on the second face viewed from above after the glass panel has been reversed and placed on the work table with the second face of the glass panel facing upward, and the side opposite a first side of the two orthogonal sides and the side opposite a second side of the two orthogonal sides are repositioned at the reference position for the glass panel, and, based on this difference, the offset amount for the preset glazing gasket forming position on the second face of the glass panel is determined. Then, when the glazing gasket is formed on the second face of the glass panel, the application starting position of the application nozzle is corrected based on the offset amount.

Therefore, it is possible to automatically align the forming positions of the glazing gaskets that are individually formed on the peripheries of the front and rear sides of the glass panel, and it is possible to properly ensure the water tightness and the air tightness of the multilayer glass panel.

DETAILED DESCRIPTION

First Embodiment

An embodiment of a multilayer glass panel with a glazing gasket manufacturing apparatus using a method of the present technology is described hereinafter with reference to the drawings. However, the multilayer glass panel with a glazing gasket manufacturing method and the apparatus according to the present technology is not limited to the embodiments described below.

Figure 2:
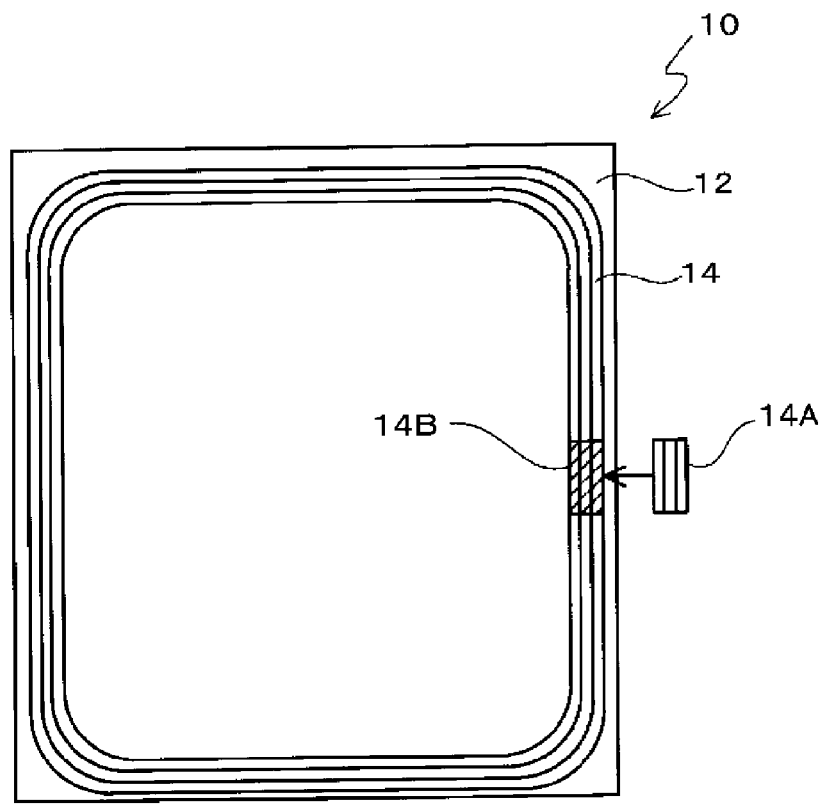
FIG. 2 is a plan view of a multilayer glass panel with a glazing gasket.

As illustrated in FIG. 2, a multilayer glass panel with a glazing gasket 10 includes a multilayer glass panel 12 and a glazing gasket 14, the multilayer glass panel 12 includes two rectangular panes of glass of the same shape and size, and an air gap formed by a spacer between peripheral edges of the two panes of glass.

The glazing gasket 14 is attached in a rectangular framework form along the peripheral edges of both a front side and a rear side of the multilayer glass panel 12.

Figure 3:
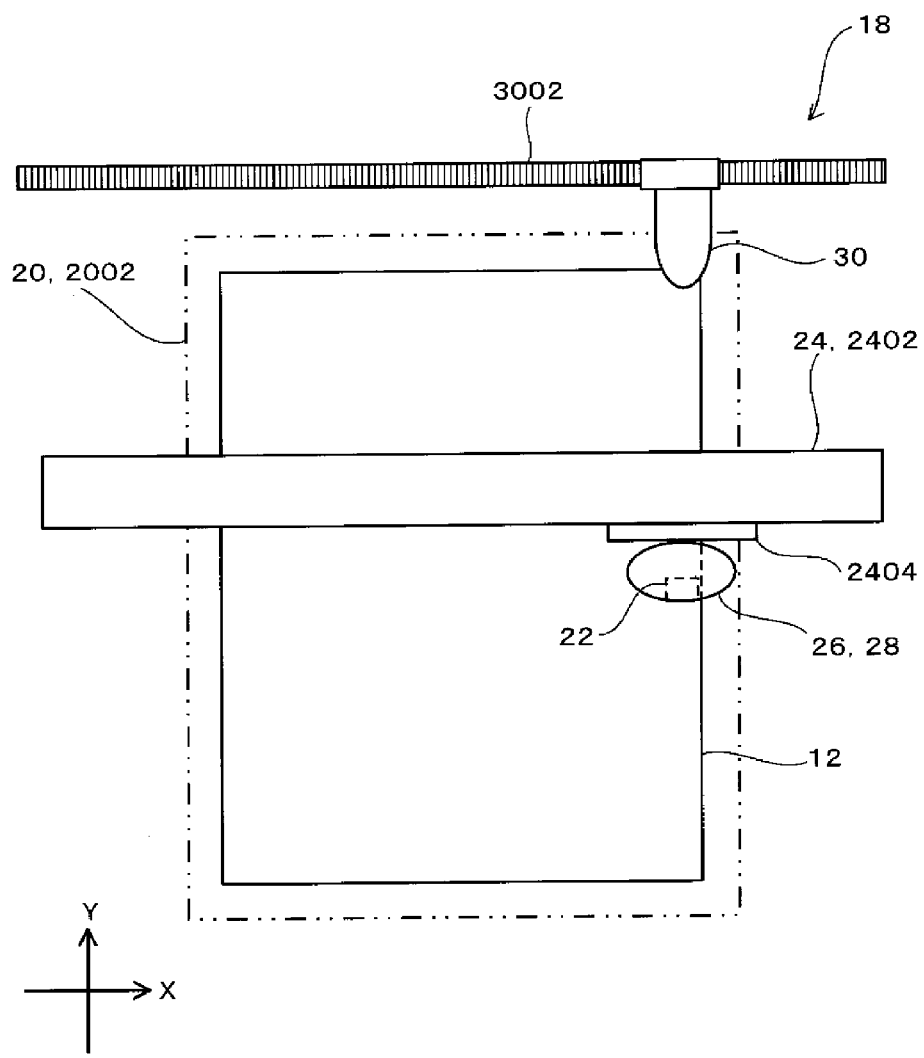
FIG. 3 is a schematic plan view of a glass panel with a glazing gasket manufacturing apparatus according to an embodiment of the present technology.

As illustrated in FIG. 3, the glazing gasket 14 is attached to both sides of the multilayer glass panel 12 by a glass panel with a glazing gasket manufacturing apparatus 18.

The glass panel with a glazing gasket manufacturing apparatus 18 includes a glazing gasket application device, and the glazing gasket application device includes a multilayer glass panel movement mechanism 20, an application nozzle 22, a horizontal movement mechanism 24 for moving the application nozzle 22, a swiveling mechanism 26, an elevator mechanism 28, and a laser cutting device 30 that cuts the applied glazing gasket 14.

The multilayer glass panel movement mechanism 20 horizontally supports the multilayer glass panel 12 and moves the multilayer glass panel 12 in a horizontal plane in a Y direction which is one of two orthogonal directions.

The multilayer glass panel movement mechanism 20 includes a work table 2002 having a placement surface on which the multilayer glass panel 12 is placed, and a movement part (not illustrated) that moves the work table 2002 in the Y direction.

The movement part includes a feed screw (not illustrated), a female screw member (not illustrated), a guide rod (not illustrated), an insertion part, and a pulse motor (not illustrated).

The feed screw extends in the Y direction. The female screw member is screwed into the feed screw provided on the work table 2002. The guide rod extends in the Y direction, and the guide rod is inserted into the insertion part. The pulse motor drives the feed screw. Therefore, the work table 2002 is moved in the Y direction by rotating the pulse motor forward or backward.

The multilayer glass panel movement mechanism 20 is not limited to the configuration described above, and it may be configured from various commonly known actuators or movement mechanisms.

The application nozzle 22 ejects glazing gasket molding material together with an adhesive and applies them onto the multilayer glass panel 12.

The glazing gasket molding material in molten form is supplied from an extruder (not illustrated) to a shot pump (not illustrated), and the shop pump delivers the glazing gasket molding material in molten form under pressure to the application nozzle 22. Also, the adhesive in molten form is supplied to the shot pump (not illustrated), and the shop pump delivers the adhesive in molten form under pressure to the application nozzle 22. Then, the adhesive together with the glazing gasket molding material is ejected from an outlet of the application nozzle onto a surface of the multilayer glass panel 12, and the glazing gasket is formed and attached to the multilayer glass panel 12 by hardening the glazing gasket molding material and the adhesive.

The horizontal movement mechanism 24 moves the application nozzle 22 in a horizontal plane in an X direction, which is the other of the two orthogonal directions, so that the application nozzle 22 is in a position above a top surface of the multilayer glass panel 12 supported by the multilayer glass panel movement mechanism 20.

The horizontal movement mechanism 24 includes a guide rail 2402 supported by a frame (not illustrated), and extends in the X direction above the table 2002 of the multilayer glass panel movement mechanism 20, and an X axis carrier 2404.

The X axis carrier 2404 can move forward and backward along the X axis direction on the guide rail 2402. The application nozzle 22 is supported by the X axis carrier 2404.

The horizontal movement mechanism 24 includes a drive unit that includes a feed screw, a pulse motor and the like to move the X axis carrier 2404 in the X direction.

Therefore, the application nozzle 22 is moved in the X direction by rotating the pulse motor forward or rear.

The horizontal movement mechanism 24 is not limited to the configuration described above, and it may be configured from various commonly known actuators or movement mechanisms.

The swiveling mechanism 26 changes the orientation of the application nozzle 22 at the corners of the multilayer glass panel 12, and is supported by the X axis carrier 2404.

The swiveling mechanism 26 swivels the application nozzle 22 in the horizontal plane about an axis that extends in the vertical direction, so that, at each corner of the multilayer glass panel 12, the orientation of the application nozzle 22 is changed by 90° each time to 0°, 90°, 180°, 270°, and 0°. In this way, the direction of application of the glazing gasket molding material is changed by 90° each time from 90°, 180°, 270°, to 0°.

The swiveling mechanism 26 includes a swiveling platform to which the application nozzle 22 is attached, a bearing mechanism that supports the swiveling platform so that it can swivel about a vertical axis, and a pulse motor that rotates the swiveling platform.

Therefore, the application nozzle 22 is swiveled about an axis that extends in the vertical direction by rotating the pulse motor forward or rear.

The swiveling mechanism 26 is not limited to the configuration described above, and it may be configured from various commonly known actuators or movement mechanisms.

The elevator mechanism 28 raises and lowers the application nozzle 22 on the swiveling platform at an application starting point where application of the glazing gasket 14 starts and an application finishing point where the application finishes.

Also, the elevator mechanism 28 retracts the application nozzle 22 to a retracted position above the glazing gasket 14 that has been applied to the multilayer glass panel 12. In this way, the application nozzle 22 is prevented from interfering with the glazing gasket 14 after it has been applied, so it is possible to move the multilayer glass panel with a glazing gasket 10 out and in.

The elevator mechanism 28 includes a drive unit that includes a feed screw for raising and lowering the application nozzle 22, a pulse motor for driving the feed screw, and the like.

Therefore, the application nozzle 22 is raised and lowered by rotating the pulse motor forward or rear.

The elevator mechanism 28 is not limited to the configuration described above, and it may be configured from various commonly known actuators or movement mechanisms.

The laser cutting device 30 cuts the glazing gasket 14 by irradiating it with laser light, and is moved in the X direction by a feed screw 3002.

A laser marker or the like that forms lines or characters on the surface of various materials by irradiating it with laser light can be used as the laser cutting device 30, for example.

Various wavelengths can be considered for the laser light emitted from the laser cutting device 30, but a wavelength that passes through glass and that reliably cuts the glazing gasket 14 may be used. Various types of commonly known laser light such as a YAG (yttrium aluminum garnet) laser can be used as the laser light.

When the glazing gasket molding material is ejected from the application nozzle 22 together with the adhesive and applied to the multilayer glass panel 12, at the application starting point and at the application finishing point, the quantity of adhesive and glazing gasket molding material ejected is not stable, so the cross-sectional shape of the molded glazing gasket 14 is not the required shape.

Figure 1:
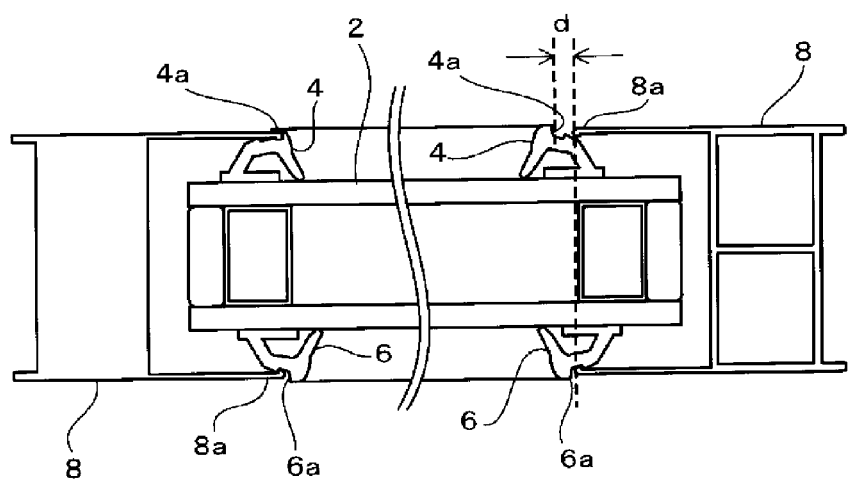
FIG. 1 is an explanatory cross-sectional view illustrating a relationship between a multilayer glass panel with a glazing gasket and a sash according to prior art.

Therefore, as illustrated in FIG. 2, the laser cutting device 30 cuts and removes a portion 14B applied at these two application locations (the portion hatched), and a glazing gasket molding body 14A of the same cross-sectional shape that was formed in advance and has the same length as the length of the removed portion is fitted in to the removed location, and bonded with an adhesive, and in this way, the glazing gasket 14 is formed around the whole periphery of the top surface of the multilayer glass panel 12 as illustrated in FIG. 1.

Next, a case in which the glazing gasket is formed on both the front side and the rear side of the multilayer glass panel 12 with the position of application of the glazing gasket on the front side aligned with the position of application of the glazing gasket on the rear side is described in detail with reference to FIGS. 4 to 10.

The glass panel with a glazing gasket manufacturing apparatus 18 according to this embodiment further includes a positioning member 32, a reference member 34, a laser distance meter 36, and a calculation and display device 38, in addition to the various mechanisms described in FIG. 3.

The positioning member 32 positions the multilayer glass panel 12 placed on the work table 2002 with a cushion 40 therebetween in a reference position for a glass panel.

Figure 4A:
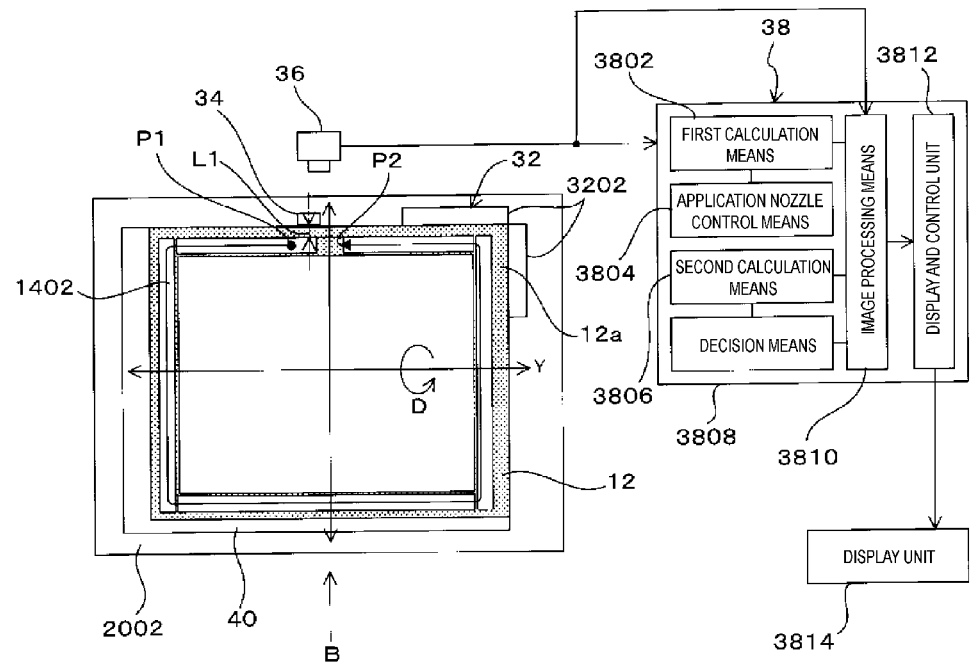
FIG. 4A is an explanatory plan view of the glass panel with a glazing gasket manufacturing apparatus illustrating a state in which an application position of the glazing gasket formed on a front side of a multilayer glass panel is being measured with a laser distance meter.
Figure 4B:
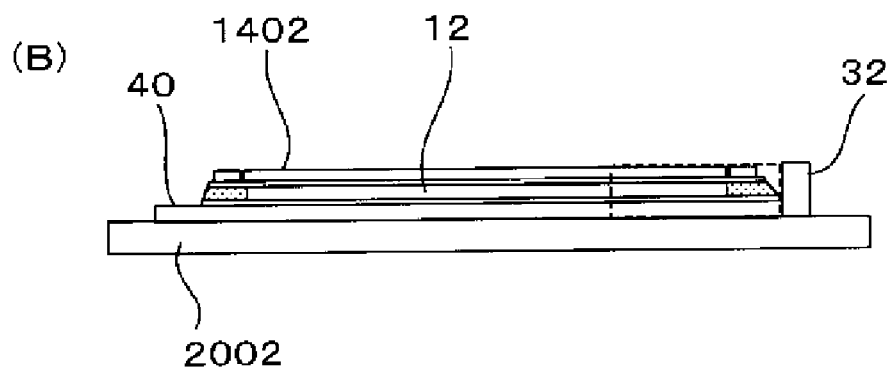
FIG. 4B is an explanatory side view from a direction of the arrow B in FIG. 4A.

As illustrated in FIG. 4A, the positioning member 32 is located in a corner of the work table 2002 and includes a pair of rectangular prism shaped blocks 3202 disposed at a right angle to each other along two orthogonal sides of the corner. Then, by pressing two orthogonal sides of the multilayer glass panel 12 placed on the work table 2002 against inner wall surfaces of the pair of rectangular prism shaped blocks 3202, the multilayer glass panel 12 is fixed in position on the work table 2002.

The reference member 34 sets a reference point for measurement when measuring the application position of a glazing gasket 1402 (see FIG. 4A) formed on a first face which is the front side of the multilayer glass panel 12 and the application position of a glazing gasket 1404 (see FIG. 7A) formed on a second face which is the rear side of the multilayer glass panel, using the distance from the reference point, and is disposed so as to be separated from the periphery of the multilayer glass panel 12 to an outer side of the multilayer glass panel 12.

Also, the reference member 34 is constituted by a rectangular prism block with a flat top surface disposed on the work table 2002 close to the application starting point P1 of the glazing gasket 1402 of the front side of the multilayer glass panel 12.

The laser distance meter 36 is located behind the reference member 34, and is disposed facing from behind the reference member 34 toward the reference member 34 and a side edge surface of the multilayer glass panel with a glazing gasket 12 on the work table 2002 near the reference member 34. Then, a laser pulse 36a for measurement (see FIG. 8A) is emitted from the laser distance meter 36 toward the reference member 34 and the side edge surface of the multilayer glass panel with a glazing gasket 12, so that the laser pulse 36a can be scanned in the thickness direction of the multilayer glass panel 12.

Figure 6A:
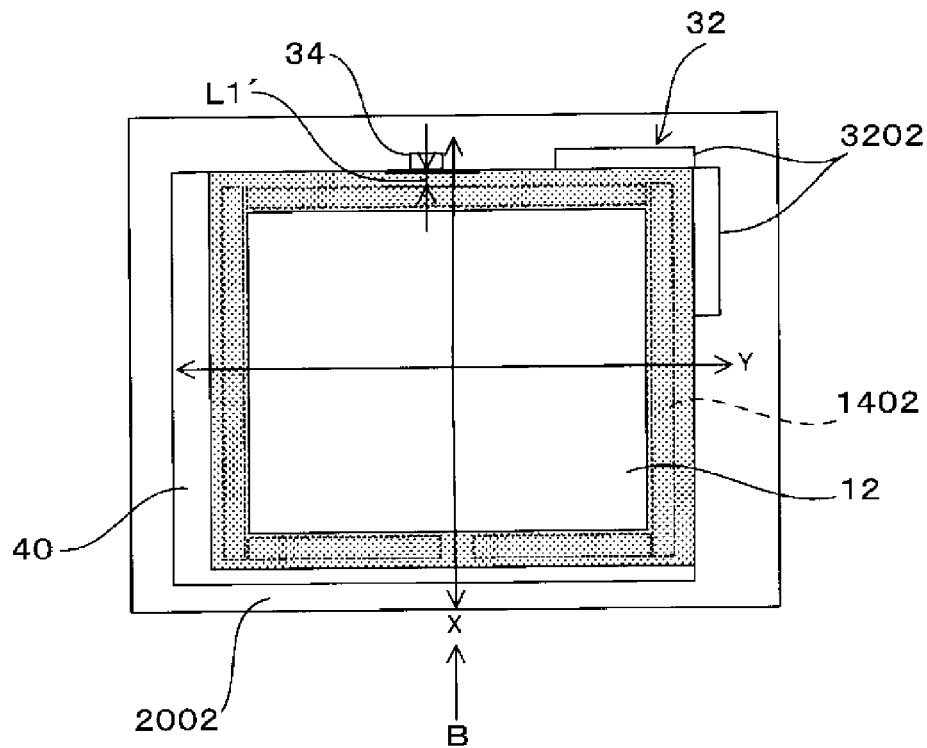
FIG. 6A is an explanatory plan view of the glass panel with a glazing gasket manufacturing apparatus illustrating a state in which, with the multilayer glass panel reversed, the application position of the glazing gasket formed on the front side of the multilayer glass panel is measured by the laser distance meter.
Figure 7A:
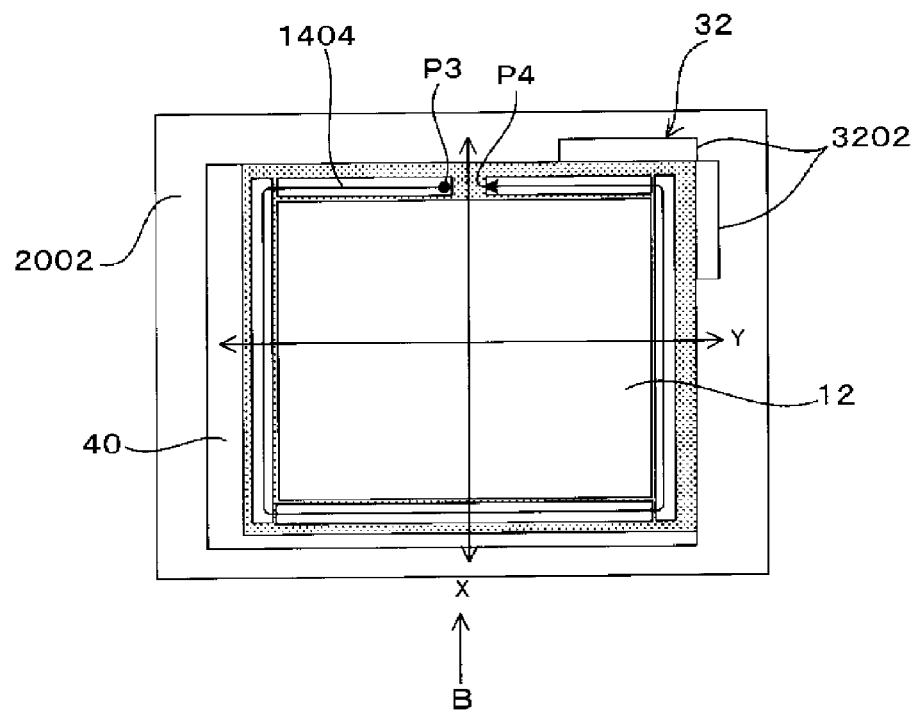
FIG. 7A is an explanatory plan view of the glass panel with a glazing gasket manufacturing apparatus illustrating a case in which the glazing gasket is formed on a rear side of the multilayer glass panel.
Figure 7B:
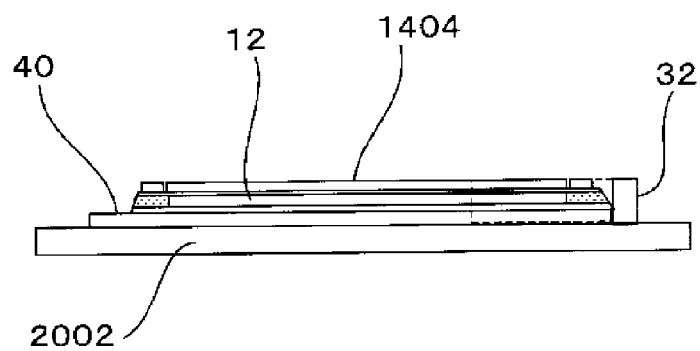
FIG. 7B is an explanatory side view from the direction of the arrow B in FIG. 7A.
Figure 8A:
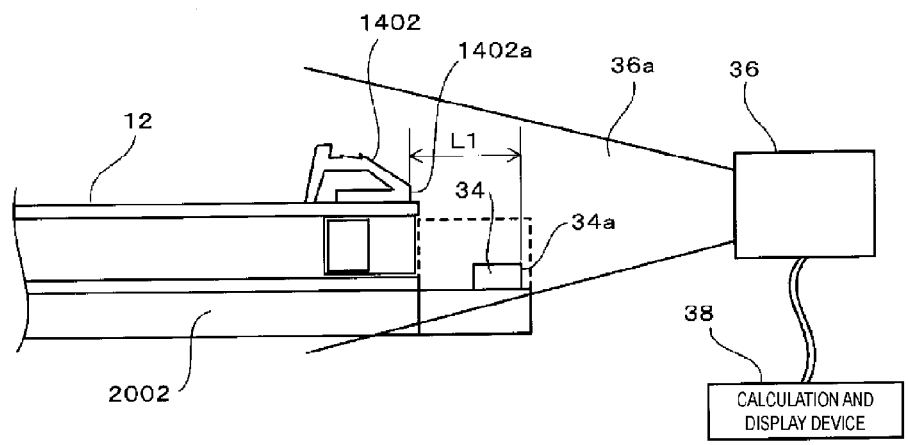
FIG. 8A is an explanatory view illustrating measurement of the application position of the glazing gasket using the laser distance meter.
Figure 9A:
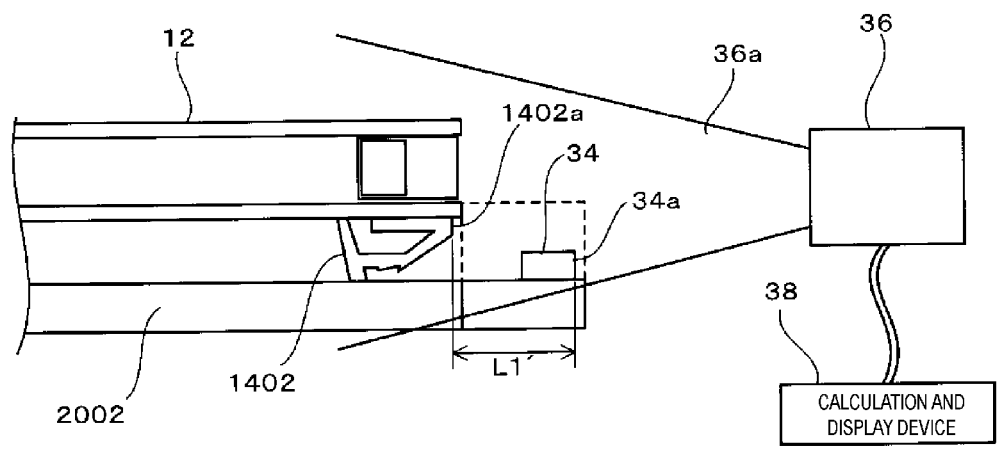
FIG. 9A is an explanatory view illustrating measurement of the application position of the glazing gasket using the laser distance meter with the multilayer glass panel reversed.
Figure 10A:
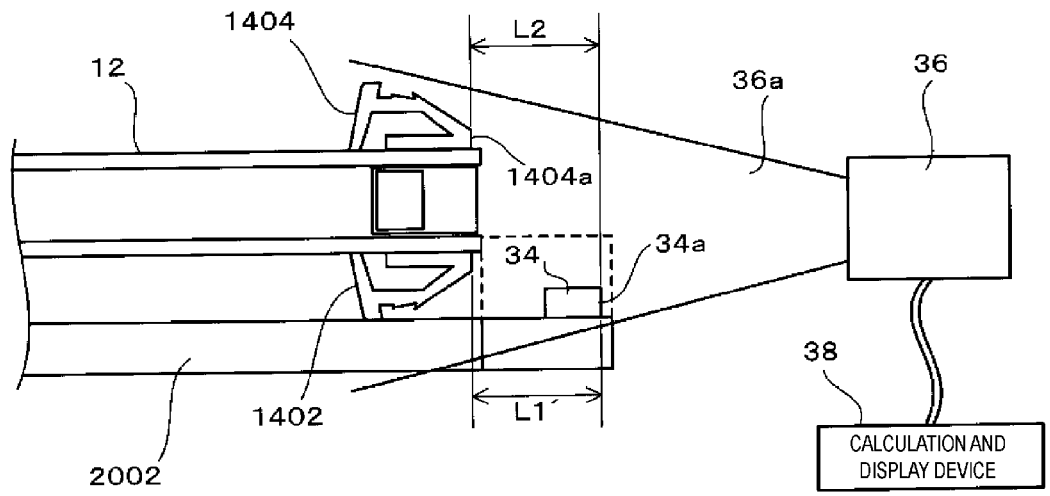
FIG. 10A is an explanatory view illustrating measurement of the application position of the glazing gasket using the laser distance meter with the glazing gasket formed on both the front and rear sides of the multilayer glass panel.

The laser distance meter 36 described above measures a first distance L1 from an end edge 34a of the reference member 34 close to the laser distance meter 36 to an end edge 1402a of the glazing gasket 1402 close to the reference member 34, as illustrated in FIG. 4A and FIG. 8A; a second distance L1' from the end edge 34a of the reference member 34 close to the laser distance meter 36 to the end edge 1402a of the glazing gasket 1402 close to the reference member 34, with the multilayer glass panel 12 reversed, positioned, and placed so that the glazing gasket 1402 on the front side is contacting the work table 2002, as illustrated in FIG. 6A and FIG. 9A; and a third distance L2 from the end edge 34a of the reference member 34 close to the laser distance meter 36 to an end edge 1404a of the glazing gasket 1404 close to the reference member 34, with the glazing gasket 1404 formed on the rear side of the reversed multilayer glass panel 12, as illustrated in FIG. 7A and FIG. 10A. Also, the laser pulse 36a for measurement is scanned in the thickness direction of the multilayer glass panel 12, so in addition to measuring the first length L1, the second length L1', and the third length L2, the distance to a plurality of points on the scan line of the side edge surface of the multilayer glass panel 12 from the end edge 34a of the reference member 34 is also measured. Then, this measured distance data is fed to the calculation and display device 38.

The laser distance meter 36 corresponds to a distance measurement means or module in the scope of the patent claims.

The calculation and display device 38 includes a first calculation means or module 3802 that determines a difference between the first length L1 and the second length L1' measured by the laser distance meter 36, and determines this difference as an offset amount of the forming position of the glazing gasket formed on the rear side of the multilayer glass panel 12; an application nozzle control means or module 3804 that corrects the application starting position of the application nozzle 22 that forms the glazing gasket 1404 on the rear side of the multilayer glass panel 12 based on the offset; a second calculation means or module 3806 that determines a difference between the third distance L2 and the second distance L1' as an amount of deviation between the glazing gaskets 1402 and 1404 formed on both the front and rear sides of the multilayer glass panel 12; a decision means or module 3808 for deciding whether or not the amount of deviation is within an allowable range; an image processing means or module 3810 for converting the first length L1, the second length L1', and the third length L2, as well as the measurement data at the plurality of points measured along the scan line measured with the laser distance meter into edge image data similar to the side edge surface shape when the glazing gaskets 1402, 1404 and the multilayer glass panel 12 are sectioned in the thickness direction; and a display and control unit 3812 that converts the edge image data into display data, outputs it to a display unit 3814 which is a liquid crystal display, and displays the measured image.

The calculation and display device 38 is constituted from a personal computer. The personal computer includes a CPU, ROM and RAM connected via a bus line, an interface, and the like. The ROM stores processes or control programs executed by the CPU, and the RAM provides a working area. The first calculation means or module 3802, the application nozzle control means or module 3804, the second calculation means or module 3806, the decision means or module 3808, the image processing means or module 3810, and the display and control unit 3812 are realized by the CPU executing calculation processes or control programs.

Also, in this embodiment, the laser distance meter 36 (distance measurement means or module) and the first calculation means or module 3802 correspond to the offset calculation means or module in the scope of the patent claims.

In other words, the offset calculation means or module calculates the difference between the glazing gasket forming position on the first face viewed from above after the multilayer glass panel 12 has been positioned at the reference position for the glass panel on the work table by the positioning member 32 with the first face of the multilayer glass panel 12 facing upward and the glazing gasket has been formed on the first face of the multilayer glass panel 12, and the forming position on the second face viewed from above after the multilayer glass panel 12 has been reversed and placed on the work table with the second face of the multilayer glass panel 12 facing upward, and the multilayer glass panel 12 has been positioned again at the reference position for the glass panel with the positioning member 32, and, based on this difference, determines the offset amount of the preset forming position of the glazing gasket on the second face of the multilayer glass panel 12.

The manufacture of the multilayer glass panel with a glazing gasket using the manufacturing apparatus configured as described above is described.

First, the multilayer glass panel 12 is placed on the cushion 40 of the work table 2002 with its front side facing upward, then, as illustrated in FIG. 4A, one corner 12a of the multilayer glass panel 12 is pressed into contact with the inner wall surfaces of the positioning member 32. In this way, the two orthogonal sides of the multilayer glass panel 12 are positioned at the reference position for the glass panel on the work table 2002, and fixed so that the multilayer glass panel 12 cannot move horizontally.

Then, the application nozzle 22 is positioned at the application starting position P1 on the front side of the multilayer glass panel 12. Then, the glazing gasket molding material in the molten state is delivered under pressure from an extruder (not illustrated) to the application nozzle 22, and an adhesive in the molten state is also delivered under pressure to the application nozzle 22, and at least one of the application nozzle 22 and the multilayer glass panel 12 is moved so that the application nozzle 22 is moved on the front side of the multilayer glass panel 12, as indicated by the arrow in FIG. 4A, along a periphery which is the position where the glazing gasket 14 is to be extended relatively in the horizontal direction from the application starting position P1 to the application finishing position P2. Then, the adhesive together with the glazing gasket molding material is ejected from an outlet of the application nozzle 22 onto the front side of the multilayer glass panel 12, and the front side glazing gasket 1402 is formed on the front side of the multilayer glass panel 12 by hardening the glazing gasket molding material and the adhesive.

In other words, the manufacturing apparatus ejects glazing gasket molding material in a constant shape together with the adhesive from the application nozzle 22 and forms the glazing gasket on the periphery of the first face of the glass panel 12 along a preset glazing gasket forming position.

Next, a laser pulse 36a for measurement is emitted from the laser distance meter 36 and scanned in the thickness direction of the multilayer glass panel 12. In this way, the first length L1 is measured as illustrated in FIG. 4A and FIG. 8A. At the same time, the laser pulse 36a for measurement measures distances between a plurality of points on the scan line. Then, the measured distance data for the plurality of points and the measured distance data for the first length L1 are fed to the calculation and display device 38.

Figure 8B:
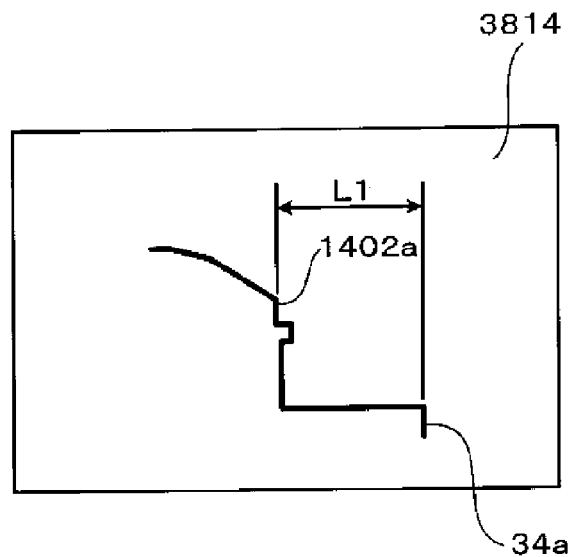
FIG. 8B is an explanatory view of a case in which glazing gasket application position measurement data is binarized and displayed as a binary image.

In the image processing means or module 3810 of the calculation and display device 38, the measured distance data for the plurality of points on the scan line and the measured distance data for the first length L1 measured by the laser distance meter 36 are converted into edge image data similar to the side edge surface shape when the glazing gasket 1402 and the multilayer glass panel 12 are sectioned in the thickness direction, and after converting the edge image data into display data by the display and control unit 3812, the data is output to the display unit 3814. In this way, the edge image as illustrated in FIG. 8B is displayed on the display unit 3814.

Figure 5A:
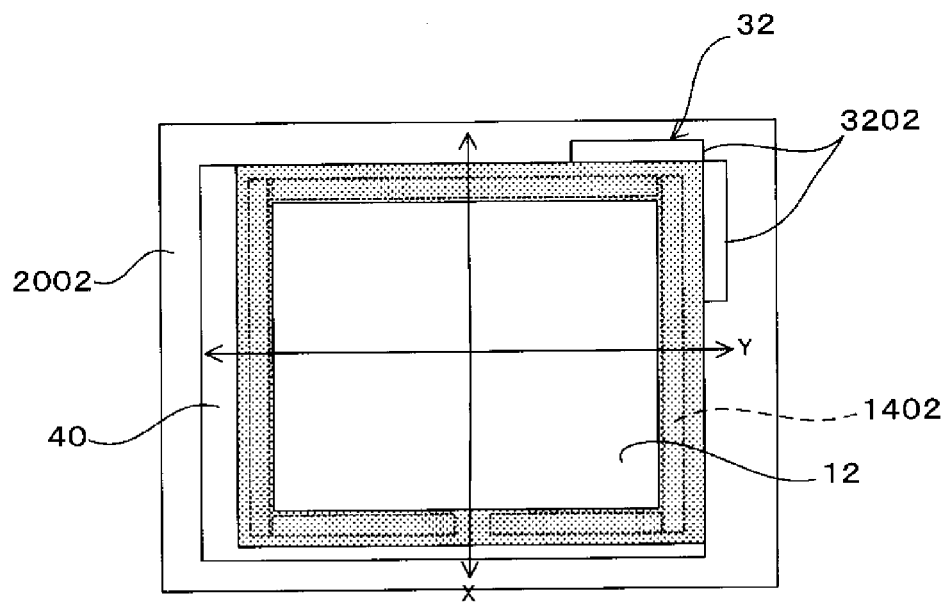
FIG. 5A is an explanatory plan view of the glass panel with a glazing gasket manufacturing apparatus illustrating a state in which the multilayer glass panel has been reversed, placed on a work table, and positioned.
Figure 5B:
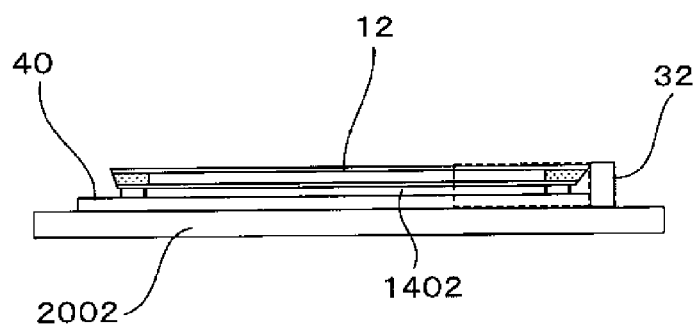
FIG. 5B is an explanatory side view from the direction of the arrow B in FIG. 5A.

Next, fixing to the multilayer glass panel 12 is released, the multilayer glass panel 12 is raised up by a work robot (not illustrated), reversed about the Y axis in FIG. 4A, oriented with the rear side of the multilayer glass panel 12 upward where the glazing gasket is not formed, and the multilayer glass panel 12 is again placed on the work table 2002. Then, a second corner 12b located on the opposite side of the multilayer glass panel 12 about the Y axis as center is pressed into contact with the internal wall surfaces of the positioning member 32, and the multilayer glass panel 12 is positioned and fixed at the reference position for the glass panel on the work table 2002. In other words, the side opposite a first side of the two orthogonal sides of the multilayer glass panel 12 and the side opposite a second side of the two orthogonal sides are pressed into contact against the internal wall surfaces of the positioning member 32 to position at the reference position for the glass panel. This state is illustrated in FIG. 5.

Figure 6B:
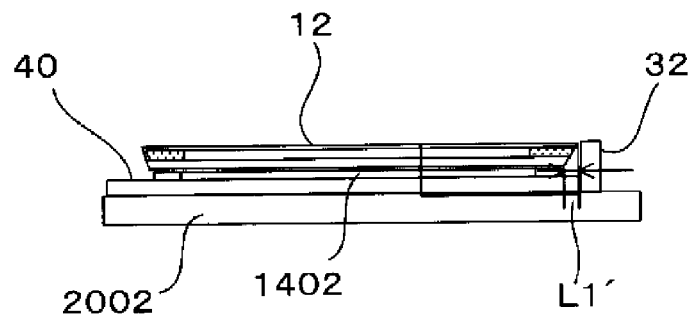
FIG. 6B is an explanatory side view from the direction of the arrow B in FIG. 6A.

Next, the laser pulse 36a for measurement is emitted from the laser distance meter 36 and scanned in the thickness direction of the reversed multilayer glass panel 12. In this way, the second length L1' illustrated in FIG. 6 and FIG. 9A is measured.

Here, the edge surface shape of the second corner 12b of the multilayer glass panel 12 is affected by the variation in the accuracy of cutting the glass and the variation in the accuracy in bonding the glass together, and the like, so even though the second corner 12b is pressed into contact with the positioning member 32, it is not the same as when the first corner 12a was pressed into contact with the positioning member 32, so a deviation is produced between the two. Therefore, the second distance is L1', to take into consideration the difference between the first distance and the second distance.

The second distance L1' is measured, and the distance to a plurality of points on the scan line of the laser pulse 36a for measurement is also measured. Then, the measured distance data for the plurality of points and the measured distance data for the second length L1' are fed to the calculation and display device 38.

Figure 9B:
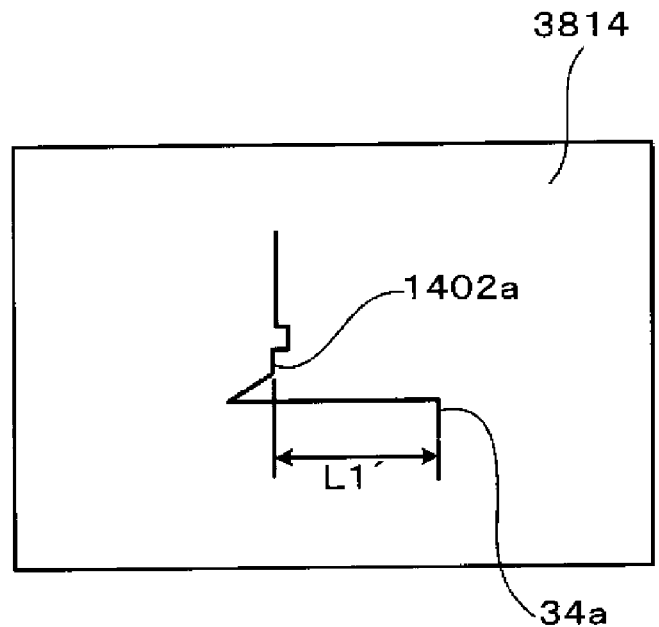
FIG. 9B is an explanatory view of the case in which the glazing gasket application position measurement data is binarized and displayed as a binary image.

In the image processing means or module 3810 of the calculation and display device 38, the measured distance data for the plurality of points on the scan line and the measured distance data for the second length L1' measured by the laser distance meter 36 are converted into edge image data similar to the side edge surface shape when the glazing gasket 1402 and the multilayer glass panel 12 are sectioned in the thickness direction, and after converting the edge image data into display data by the display and control unit 3812, the data is output to the display unit 3814. In this way, the edge image as illustrated in FIG. 9B is displayed on the display unit 3814.

On the other hand, in the first calculation means or module 3802 of the calculation and display device 38, the difference between the first distance L1 and the second distance L1' measured by the laser distance meter 36 is calculated as the offset amount of the forming position of the glazing gasket formed on the rear side of the multilayer glass panel 12. In the application nozzle control means or module 3804 of the calculation and display device 38, the multilayer glass panel 12 is moved in the X direction based on the offset amount calculated by the first calculation means or module 3802, and the application starting position of the application nozzle 22 for forming the glazing gasket 1404 on the rear side of the multilayer glass panel 12 is corrected. Then, the glazing gasket molding material in the molten state is delivered under pressure from an extruder (not illustrated) to the application nozzle 22, and an adhesive in the molten state is also delivered under pressure to the application nozzle 22, and at least one of the application nozzle 22 and the multilayer glass panel 12 is moved so that the application nozzle 22 is moved on the rear side of the multilayer glass panel 12, as indicated by the arrow in FIG. 7A, along the periphery which is the position where the glazing gasket 14 is to be extended relatively in the horizontal direction from the application starting position P3 to the application finishing position P4. Then, the adhesive together with the glazing gasket molding material is ejected from the outlet of the application nozzle 22 onto the rear side of the multilayer glass panel 12, and the rear side glazing gasket 1404 is formed on the rear side of the multilayer glass panel 12 by hardening the glazing gasket molding material and the adhesive.

In other words, the manufacturing apparatus ejects glazing gasket molding material in a constant shape together with the adhesive from the application nozzle 22 and forms the glazing gasket on the periphery of the second face of the glass panel 12 along a preset glazing gasket forming position.

After the rear side glazing gasket 1404 has been formed on the rear side of the multilayer glass panel 12, the laser pulse 36a for measurement is emitted from the laser distance meter 36 and scanned in the thickness direction of the multilayer glass panel 12. In this way, the second distance L1' and the third distance L2 illustrated in FIG. 10A are measured. At the same time, the laser pulse 36a for measurement measures the distance to a plurality of points on the scan line. Then, the measured distance data for the plurality of points and the measured distance data for the second distance L1' and the third distance L2 are fed to the calculation and display device 38.

Figure 10B:
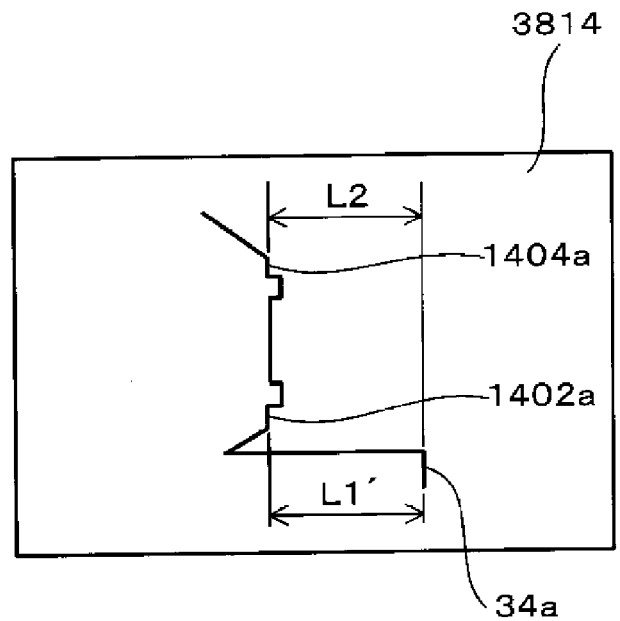
FIG. 10B is an explanatory view of a case in which the glazing gasket application position measurement data for both the front and rear sides is binarized and displayed as a binary image.

In the image processing means or module 3810 of the calculation and display device 38, the measured distance data for the plurality of points on the scan line and the measured distance data for the second distance L1' and the third distance L2 measured by the laser distance meter 36 are converted into edge image data similar to the side edge surface shape when the glazing gaskets 1402, 1404 and the multilayer glass panel 12 are sectioned in the thickness direction, and after converting the edge image data into display data by the display and control unit 3812, the data is output to the display unit 3814. In this way, the edge image as shown in FIG. 10B is displayed on the display unit 3814.

On the other hand, in the second calculation means-means or module 3806 of the calculation and display device 38, the difference between the third distance L2 and the second distance L1' measured by the laser distance meter 36 is calculated as the amount of deviation between the glazing gaskets 1402 and 1404 formed on the front and rear sides of the multilayer glass panel 12. Then, the decision means or module 3808 of the calculation and display device 38 decides whether or not the calculated amount of deviation is within an allowable range (for example, a value of less than 1 mm).

In the manufacturing method according to this embodiment, it was confirmed that the amount of deviation between the front side glazing gasket 1402 and the rear side glazing gasket 1404 was 0.168 mm.

According to this embodiment, the difference is calculated between the glazing gasket forming position on the first face viewed from above after the two orthogonal sides of the multilayer glass panel 12 have been positioned at the reference position for the glass panel on the work table with the first face of the multilayer glass panel 12 facing upward and the glazing gasket has been formed on the first face of the multilayer glass panel 12, and the forming position of the glazing gasket on the second face viewed from above after the multilayer glass panel 12 has been reversed and placed on the work table with the second face of the multilayer glass panel 12 facing upward, and the side opposite a first side of the two orthogonal sides and the side opposite a second side of the two orthogonal sides are repositioned at the reference position for the glass panel, and, based on this difference, the offset amount of the preset forming position of the glazing gasket on the second face of the multilayer glass panel 12 is determined, and when the glazing gasket is formed on the second face of the glass panel, the application starting position of the application nozzle is corrected based on the offset amount.

Therefore, it is possible to automatically align the forming positions of the glazing gaskets 1402, 1404 that are individually formed on the peripheries of the front and rear faces of the multilayer glass panel 12, and it is possible to properly ensure the water tightness and the air tightness of the multilayer glass panel.

In addition, it is possible to apply the glazing gasket molding material onto the multilayer glass panel at high speed, and it is easy to achieve automation of forming the glazing gasket by applying the molding material.

Also, in this embodiment, after the glazing gasket has been formed on the first face of the multilayer glass panel 12, the first distance L1 from the reference point provided so as to be separated from the periphery of the multilayer glass panel 12 to an outer side of the multilayer glass panel 12 to the glazing gasket near the reference point is measured, after measuring the distance, the multilayer glass panel 12 is reversed and placed on the work table, and after the multilayer glass panel 12 has been positioned again at the reference position for the glass panel, the second distance L1' from the reference point to the glazing gasket on the first face of the multilayer glass panel 12 near the reference point is measured, and the difference between the first distance L1 and the second distance L1' is determined.

Therefore, it is possible to accurately obtain the deviation in the position of the glazing gasket formed on the first face of the multilayer glass panel 12 before inverting and after inverting the multilayer glass panel 12, based on the first distance L1 and the second distance L1', so it is possible to more accurately determine the offset amount, which is advantageous for more accurately aligning the forming positions of the glazing gaskets 1402, 1404 which are individually formed on the peripheries of the front face and the rear face of the multilayer glass panel 12.

Also, in this embodiment, after the glazing gasket has been formed on the second face of the multilayer glass panel 12, the third distance L2 from the reference point to the glazing gasket of the second face of the multilayer glass panel 12 close to the reference point is measured, and the difference between the third distance L2 and the second distance L1' is determined as the amount of deviation between the glazing gaskets on both sides of the glass panel, and it is decided whether or not the amount of deviation is within the allowable range.

Therefore, this has the advantage that it is easy to accurately decide whether or not the forming positions of the glazing gaskets 1402, 1404 that are individually formed on the front face and the rear face of the multilayer glass panel 12 are within the allowable range.

Second Embodiment

Figure 11A:
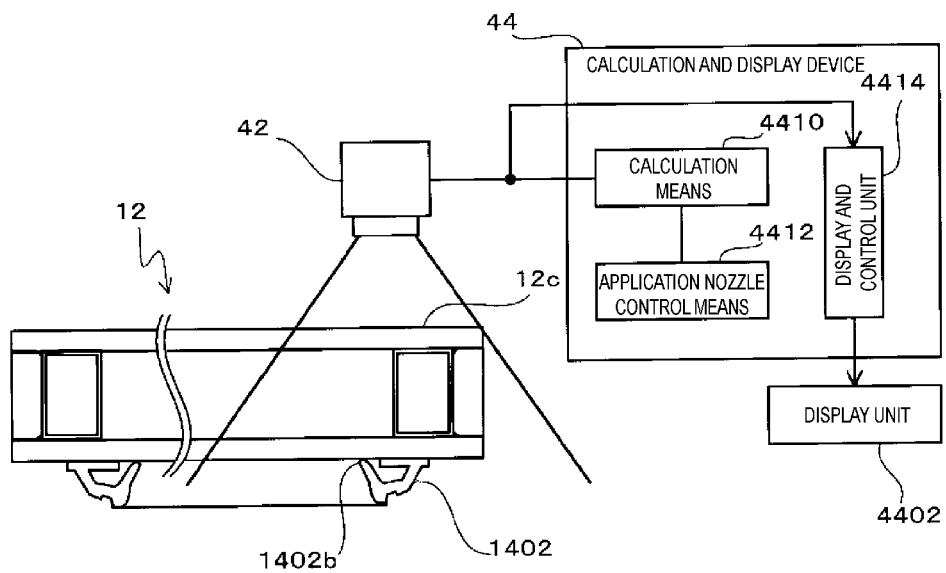
FIG. 11A is an explanatory view of a case where an imaging camera is used to detect the application position of the glazing gasket formed on the front side of the multilayer glass panel.
Figure 11B:
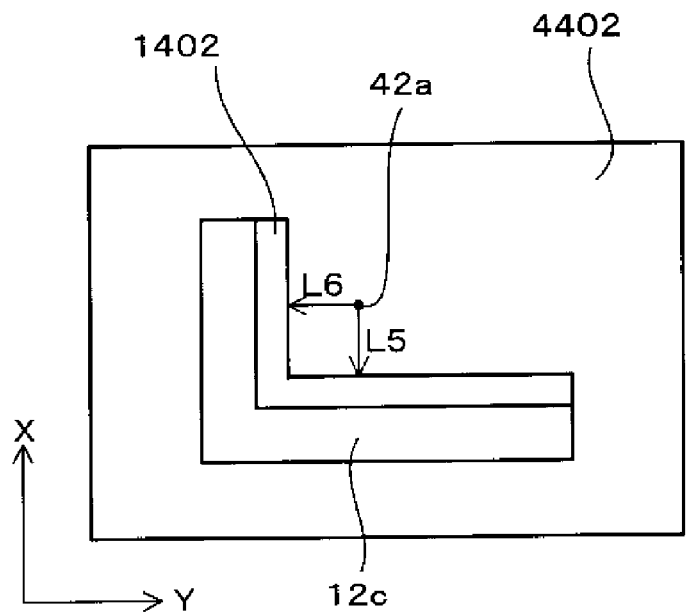
FIG. 11B is an explanatory view of a case in which glazing gasket application position image data is binarized and displayed as a binary image.

The following is a description of a second embodiment shown in FIG. 11. The second embodiment is a glass panel with a glazing gasket manufacturing method, in which at least one of the application nozzle or the work table on which the multilayer glass panel 12 is placed is moved, the glazing gasket molding material is ejected in a constant shape together with the adhesive from the application nozzle, and the glazing gasket is formed along the preset forming position of the glazing gasket on the periphery of the first face of the multilayer glass panel 12, then, the multilayer glass panel 12 is inverted and the glazing gasket is formed along the preset glazing gasket forming position on the periphery of the second face of the multilayer glass panel 12 in the same way, thereby forming a glazing gasket on both sides of the multilayer glass panel 12, the same as for the first embodiment.

As illustrated in FIG. 11, the manufacturing apparatus in the second embodiment includes an imaging camera 42, and a calculation and display device 44.

After the two orthogonal sides of the multilayer glass panel 12 have been positioned at the reference position for the glass panel on the work table 2002 using the reference member 32 and the glazing gasket is formed on the first face of the multilayer glass panel 12, and the multilayer glass panel 12 is reversed and placed on the work table 2002, and the side opposite a first side of the two orthogonal sides and the side opposite a second side of the two orthogonal sides are positioned at the reference position for the glass panel using the reference member 32, the imaging camera 42 takes an image of one corner of the multilayer glass panel 12 from above the corner.

The imaging camera 42 is constituted from a CCD image sensor or the like disposed at a fixed point located above the corner 12c.

The calculation and display device 44 is constituted from a personal computer, and the personal computer includes a CPU, ROM and RAM connected via a bus line, an interface, and the like. The ROM stores processes and control programs executed by the CPU, and the RAM provides a working area for storing images taken by the imaging camera 42 as binary image data.

A calculation means or module or module 4410, an application nozzle control means or module or module 4412, and a display and control unit 4414 are realized by the CPU executing the calculation processes or control programs described above.

The calculation means or module 4410 determines a distance L5 in the X direction and a distance L6 in the Y direction from a preset reference point to the inside edge of the glazing gasket based on image data taken by the imaging camera 42 that includes an image of the glazing gasket formed on the first face that can be seen through the corner; determines the difference between the preset glazing gasket forming position as the glazing gasket forming position on the first face viewed from above, and the glazing gasket forming position on the second face viewed from above detected based on the distance L5 and the distance L6; and determines the offset amount for the preset glazing gasket forming position on the second face of the multilayer glass panel 12 based on this difference.

Also, in the second embodiment, the imaging camera 42 and the calculation means or module 4410 correspond to the offset amount calculation means or module in the scope of the patent claims.

The application nozzle control means or module 4412 corrects the application starting position of the application nozzle 22 that forms the glazing gasket 1404 on the rear side of the multilayer glass panel 12 based on the offset amount.

Image data taken by the imaging camera 42 is output to a display unit 4402 and the measured image is displayed.

Figure 12:
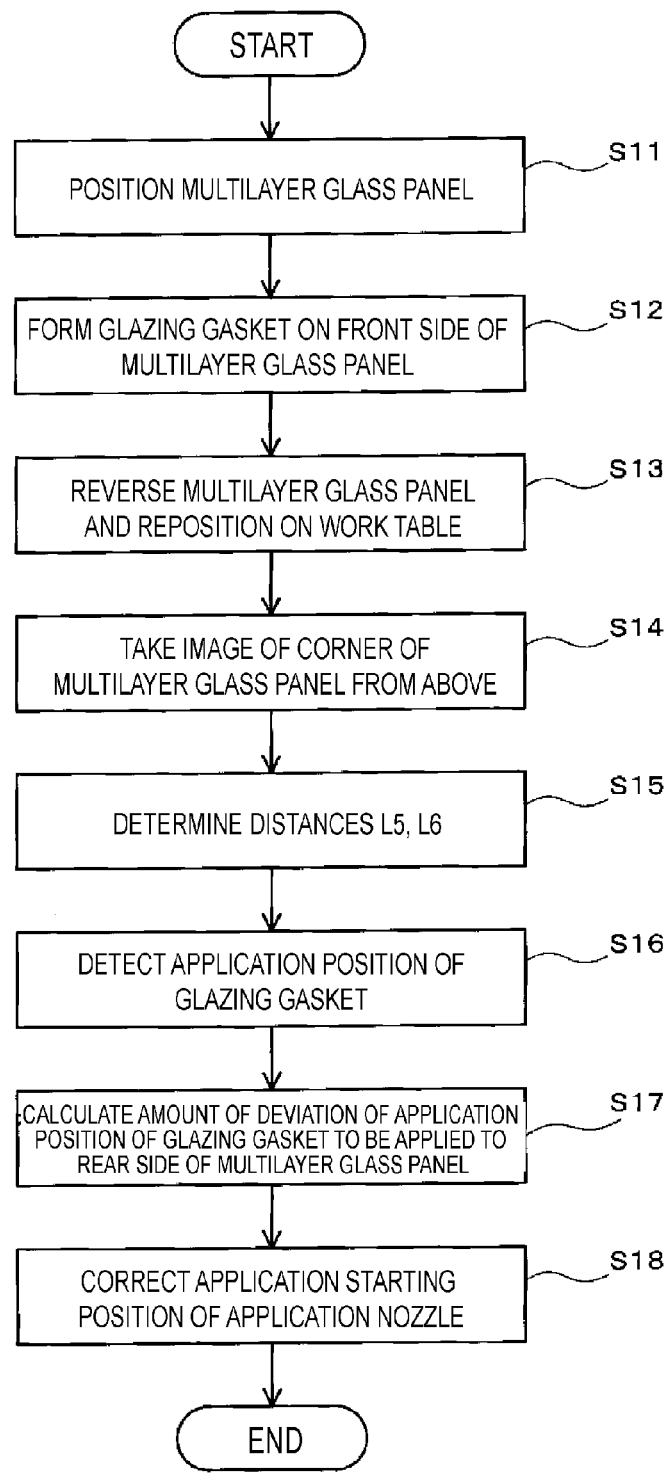
FIG. 12 is a flowchart illustrating a process procedure of a multilayer glass panel with a glazing gasket manufacturing method according to another embodiment of the present technology.

The following is a description of the glass panel with a glazing gasket manufacturing method with reference to FIGS. 11 and 12.

When manufacturing the glass panel with a glazing gasket, first, the two orthogonal sides of the multilayer glass panel 12 are positioned at the reference position for the glass panel on a work table as illustrated in FIG. 4A using the positioning member 32 (step S11). Then, the glazing gasket 1402 is formed on the front side of the multilayer glass panel 12 (step S12).

Next, as illustrated in FIG. 11A, the multilayer glass panel 12 is reversed and placed on the work table, and the side opposite a first side of the two orthogonal sides and the side opposite a second side of the two orthogonal sides of the multilayer glass panel 12 are repositioned at the reference position for the glass panel using the positioning member 32 (step S13). Then, one right angle corner 12c of the reversed multilayer glass panel 12 and the front side glazing gasket 1402 which can be seen through the corner 12c are photographed by the imaging camera 42 (step S14). The image data taken by the imaging camera 42 is fed to the calculation and display device 44, where the following process is executed.

Namely, based on the image data taken by the imaging camera 42, the calculation means or module 4410 determines from the number of pixels of the image data the distance L5 in the X direction and the distance L6 in the Y direction, which is perpendicular to the X direction, from a reference point 42a provided on the display screen of the display unit 4402 of the imaging camera 42 to the internal edge 1402b of the glazing gasket 1402 in the corner 12c (step S15).

Then, the calculation means or module 4410 detects the application position of the front side glazing gasket 1402 of the reversed multilayer glass panel 12, based on the distance L5 and the distance L6 (step S16).

Then, the calculation means or module 4410 calculates the amount of deviation of the application position of the glazing gasket to be applied to the rear face of the multilayer glass panel 12 based on the application position data of the detected front side glazing gasket 1402 (step S17).

Namely, the calculation means or module 4410 calculates the difference between the preset glazing gasket forming position as the glazing gasket forming position on the first face viewed from above, and the glazing gasket forming position on the second face viewed from above detected based on the distance L5 and the distance L6, and determines the offset amount for the preset glazing gasket forming position on the second face of the multilayer glass panel 12 based on this difference.

Then, the application nozzle control means or module 4412 corrects the application starting position of the application nozzle when forming the glazing gasket on the rear side of the multilayer glass panel 12 based on the offset amount (step S18).

As described above, in the second embodiment, the application starting position of the application nozzle is corrected by the offset amount determined from the difference between the glazing gasket forming position on the first face viewed from above the multilayer glass panel 12 that has been positioned at the reference position for the glass panel, and the glazing gasket forming position on the second face viewed from above the multilayer glass panel 12 that has been reversed and positioned at the reference position for the glass panel with the second face facing upward, the same as for the first embodiment.

Therefore, it is possible to automatically align the forming positions of the two glazing gaskets 1402, 1404 formed on the front side and the rear side of the multilayer glass panel 12 and to properly ensure the water tightness and the air tightness of the multilayer glass panel 12, and it is possible to easily achieve automation of forming the glazing gaskets by applying the molding material.

Also, in the second embodiment, the difference between the preset forming position of the glazing gasket as the glazing gasket forming position on the first face viewed from above, and the glazing gasket forming position on the second face viewed from above that is detected based on the distance L5 and the distance L6 determined from the image data taken by the imaging camera 42 is determined, and the offset amount of the preset forming position of the glazing gasket on the second face of the multilayer glass panel 12 is determined based on this difference.

Therefore, after the glazing gasket has been formed on the first face of the multilayer glass panel 12, if an image is taken once by the imaging camera 42 when the multilayer glass panel 12 has been reversed, it is possible to determine the offset amount of the preset forming position of the glazing gasket on the second face of the multilayer glass panel 12, so only one measurement operation is required, which has the advantage of reducing the number of manufacturing operations.

In this embodiment, a case in which the glazing gasket molding material 1410 is attached to the multilayer glass panel 12 has been described, but, of course, this embodiment can also be applied to a case in which the glazing gasket molding material 1410 is attached to a single glass panel.

Also, the distance measurement means or module in the present technology is not limited to the laser distance meter described in the embodiments, and any type of measuring device can be used provided it is capable of measuring the first, second, and third distances.

The invention claimed is:

1. A method of manufacturing a glass panel with a glazing gasket in which the glazing gasket is formed along a preset glazing gasket forming position on a periphery of a first face of a rectangular glass panel by ejecting glazing gasket molding material in a constant shape together with an adhesive from an application nozzle while at least one of the application nozzle and a work table on which the glass panel is placed is moved, wherein the glass panel is reversed and the glazing gasket is formed along a preset glazing gasket forming position on a periphery of a second face of the glass panel, thereby forming the glazing gasket on both sides of the glass panel, the method comprising:
   calculating a difference between the glazing gasket forming position on the first face viewed from above, after two orthogonal sides of the glass panel have been positioned at a reference position for the glass panel on the work table with the first face facing upward and the glazing gasket has been formed on the first face of the glass panel, and the glazing gasket forming position on the second face viewed from above, after the glass panel has been reversed and placed on the work table with the second face facing upward and the side opposite a first side of the two orthogonal sides and the side opposite a second side of the two orthogonal sides have been repositioned at the reference position for the glass panel;
   determining an offset amount for the preset glazing gasket forming position on the second face of the glass panel based on the difference; and
   correcting the application starting position of the application nozzle based on the offset amount when forming the glazing gasket on the second face of the glass panel.

2. The method according to claim 1, wherein calculating the difference includes:
   measuring a first distance from a reference point provided so as to be separated from a periphery of the glass panel to an outer side of the glass panel to the glazing gasket near the reference point, after the glazing gasket has been formed on the first face of the glass panel;
   measuring a second distance from the reference point to the glazing gasket on the first face of the glass panel near the reference point, after the first distance has been measured and after the glass panel has been reversed and placed on the work table, and the glass panel has been repositioned at the reference position for the glass panel; and
   determining the difference as the difference between the first distance and the second distance.

3. The method according to claim 2, wherein after the application starting position has been corrected and the glazing gasket has been formed on the second face of the glass panel, a third distance from the reference point to the glazing gasket on the second face of the glass panel near the reference point is measured, a difference between the third distance and the second distance is determined as an amount of deviation between the glazing gaskets on both sides of the glass panel, and it is determined whether or not the amount of deviation is within an allowable range.

4. The method according to claim 1, wherein calculating the difference includes:
   after the two orthogonal sides of the glass panel have been positioned at the reference position on the work table and the glazing gasket has been formed on the first face of the glass panel, reversing the glass panel and placing the glass panel on the work table, and positioning the side opposite a first side of the two orthogonal sides and the side opposite a second side of the two orthogonal sides at a reference position for the glass panel,
   taking an image of one corner of the reversed glass panel using an imaging camera from above the corner,
   determining a distance L5 in an X direction and a distance L6 in a Y direction from a reference point provided in advance to an inside edge of the glazing gasket based on image data of the image taken by the imaging camera that includes an image of the glazing gasket formed on the first face as seen through the corner, and
   determining the difference as a difference between the preset reference glazing gasket forming position as the glazing gasket forming position on the first face viewed from above, and the glazing gasket forming position on the second face viewed from above detected based on the distance L5 and the distance L6.

5. A manufacturing apparatus for manufacturing a glass panel with a glazing gasket in which a glazing gasket is formed along a preset glazing gasket forming position on a periphery of a first face of a rectangular glass panel by ejecting a glazing gasket molding material in a constant shape together with an adhesive from an application nozzle while at least one of the application nozzle and a work table on which the glass panel is placed is moved, then, the glass panel is reversed and a glazing gasket is formed along a preset glazing gasket forming position in the same way on a periphery of a second face of the glass panel, thereby forming the glazing gasket on both sides of the glass panel, the apparatus comprising:
   a positioning member provided on the work table that positions two orthogonal sides of the glass panel at a reference position for the glass panel;

an offset amount calculation module for calculating a difference between the glazing gasket forming position on the first face viewed from above after the glass panel has been positioned at the reference position for the glass panel on the work table using the positioning member with the first face facing upward and the glazing gasket has been formed on the first face of the glass panel, and the forming position on the second face viewed from above after the glass panel has been reversed and placed on the work table with the second face facing upward and the side opposite a first side of the two orthogonal sides and the side opposite a second side of the two orthogonal sides have been repositioned at the reference position for the glass panel using the positioning member, and determining an offset amount for the preset glazing gasket forming position on the second face of the glass panel based on the difference; and an application nozzle control module for correcting an application starting position of the application nozzle that forms the glazing gasket on the second face of the glass panel based on the offset amount.

6. The apparatus according to claim 5, further comprising a reference member that sets a reference point for measurement provided on the work table and disposed so as to be separated from a periphery of the glass panel to an outer side of the glass panel, wherein the offset amount calculation module includes:
a distance measurement module for measuring a distance from the reference point to the glazing gaskets formed on both sides of the glass panel, disposed so that a measurement laser irradiates the reference member and a side edge surface of the glass panel that is positioned and placed on the work table from a position behind the reference member and the measurement laser is scanned in the thickness direction of the glass panel; and a first calculation module for calculating a difference between a first distance which is the distance from the glazing gasket near the reference point to the reference point before the glass panel is reversed and after the glazing gasket has been formed on the first face of the glass panel, and a second distance from the reference point to the glazing gasket on the first face near the reference point after the glass panel has been reversed after the first distance has been measured, each measured by the distance measurement module, and determining the offset amount based on the difference.

7. The apparatus according to claim 6, further comprising:
a second calculation module for determining a third distance from the reference point to the glazing gasket on the second face of the glass panel near the reference point measured by the distance measurement module after the application starting position has been corrected and the glazing gasket has been formed on the second face of the glass panel, and determining a difference between the third distance and the second distance as an amount of deviation between the glazing gaskets on both sides of the glass panel; and a decision module for determining whether the amount of deviation is within an allowable range.

8. The apparatus according to claim 5, wherein the offset amount calculation module includes:
an imaging camera that takes an image of one corner of the reversed glass panel from above the corner, after the two orthogonal sides of the glass panel have been positioned at the reference position for the glass panel on the work table by the reference member and the glazing gasket has been formed on the first face of the glass panel, the glass panel has been reversed and placed on the work table and the side opposite a first side of the two orthogonal sides and the side opposite a second side of the two orthogonal sides are positioned at the reference position for the glass panel by the reference member; and a calculation module for determining a distance L5 in an X direction and a distance L6 in a Y direction from a reference point provided in advance at an inside edge of the glazing gasket based on image data taken by the imaging camera that includes an image of the glazing gasket formed on the first face that can be seen through the corner, determining the difference as a difference between the preset reference glazing gasket forming position as the glazing gasket forming position on the first face viewed from above and the glazing gasket forming position on the second face viewed from above detected based on the distance L5 and the distance L6, and determining the offset amount based on the difference.

* * * * *